(12) United States Patent
Schmidt (10) Patent No.: US 7,423,762 B2
(45) Date of Patent: Sep. 9, 2008

(54) RUGGED FABRY-PEROT PRESSURE SENSOR

(75) Inventor: Siegmar Schmidt, Simi Valley, CA (US)

(73) Assignee: Sabeus, Inc., Calabasas, CA (US)

( * ) Notice: Subject to any disclaimer, the term of this patent is extended or adjusted under 35 U.S.C. 154(b) by 103 days.

(21) Appl. No.: 10/574,300

(22) PCT Filed: Oct. 1, 2004

(86) PCT No.: PCT/US2004/032090

§ 371 (c)(1),
(2), (4) Date: Mar. 31, 2006

(87) PCT Pub. No.: WO2005/033643

PCT Pub. Date: Apr. 14, 2005

(65) Prior Publication Data

US 2007/0041019 A1    Feb. 22, 2007

Related U.S. Application Data

(60) Provisional application No. 60/508,455, filed on Oct. 3, 2003.

(51) Int. Cl.
*G01B 9/02* (2006.01)
*G01L 1/24* (2006.01)

(52) U.S. Cl. .................... 356/480; 356/35.5; 356/519

(58) Field of Classification Search ............... 356/35.5, 356/480, 519; 372/32
See application file for complete search history.

(56) References Cited

U.S. PATENT DOCUMENTS

| 5,301,001 | A  |  4/1994 | Murphy et al. |
| 5,907,403 | A  |  5/1999 | Andrews et al. |
| 6,069,686 | A  |  5/2000 | Wang et al. |
| 6,141,087 | A  | 10/2000 | Viel |
| 6,439,055 | B1 * |  8/2002 | Maron et al. .................. 73/705 |
| 6,567,173 | B1 |  5/2003 | Johannesen |

OTHER PUBLICATIONS

PCT International Search Report, pp. 1-3, Mar. 10, 2005.

* cited by examiner

*Primary Examiner*—Michael A Lyons
(74) *Attorney, Agent, or Firm*—John K. Fitzgerald; Fulwider Patton LLP (57) ABSTRACT

A pressure sensor (100) and system for measuring pressure changes, especially in harsh environments, is described. The pressure sensor has a Fabry-Perot optical cavity formed within a tube (115) with a partial reflective mirror (130) provided by an end of an optical fiber (105) and a reflective mirror (135) provided by an end of a plug (120), with a gap (125) formed between. The pressure sensor may be disposed within a sensing chamber of a housing having an opening into the environment to be monitored. Alternatively, an isolator means may be used to isolate the sensor from the environment while communicating pressure changes to the sensing chamber. In another embodiment, the sensing chamber is filled with a compressible non-flowing material.

31 Claims, 4 Drawing Sheets

RUGGED FABRY-PEROT PRESSURE SENSOR

CROSS-REFERENCES TO RELATED APPLICATIONS

This application claims the benefit of priority to U.S. Provisional Application No. 60/508,455, filed Oct. 3, 2003, the subject matter of which is being incorporated herein in its entirety.

BACKGROUND OF THE INVENTION

1. Field of the Invention

The present invention is directed to pressure sensors that are sufficiently robust to be used in harsh environments, such as an oil or gas well. More specifically, the invention is directed to a rugged pressure sensor that incorporates a Fabry-Perot optical cavity with an optical fiber to provide a pressure sensor capable of sensing pressure and pressure changes by analyzing the light reflected by the Fabry-Perot cavity.

2. Description of Related Art

There are many processes and environments in which it is desirable to know the ambient pressure. One such common process or environment is during exploration and production of hydrocarbons such as oil in which it is necessary to measure the pressure of the hydrocarbons in a reservoir. Another application is the measurement of the fluid pressure associated with pumps or natural drivers for transporting such hydrocarbons from one location to another. One way that fluid flow detected senses the pressure drop across a venturi, thus requiring detection of the pressure difference on both sides of the venturi.

Pressures of fluids are typically measured with, for example, a quartz crystal based pressure measuring device such as the Quartzdyne™ Series QS High Pressure Laboratory Transducer manufactured by Quartzdyne, Inc. of Salt Lake City, Utah. Such a pressure sensing device measures the change in mechanical oscillation frequency associated with the elastic deformation of the quartz crystal in response to applied pressure. Quartz is the medium of choice for such applications due to inherent long term stability, as well as its minimal creep and hysteresis properties. The change in frequency with temperature is also very predictable.

Traditionally the change in frequency of the quartz crystal is measured and compared to a reference crystal which is temperature compensated with the resulting data correlated and calibrated to a direct pressure measurement. Although the reliability of such a quartz crystal is extremely high, the electronics required to measure frequency change are subject to failure particularly when the transducer and its associated electronics are subjected to elevated temperatures, such as temperatures above 125° C.

Pressure sensors with optical fibers and optical sensing elements are very important for remote sensing where conventional gauges cannot operate or where conventional gauges are not reliable enough.

Certain techniques exist for measuring pressure using a Bragg grating. However, such techniques are either complex, costly, or do not constrain the optical fiber from buckling in the grating region. For example, a fiber optic grating based sensor is described in U.S. patent application Ser. No. 08/925,598 entitled "High Sensitivity Fiber Optic Pressure Sensor for Use in Harsh Environments." In that example, an optical fiber is attached to a compressible bellows at one location along the fiber and to a rigid structure at a second location along the fiber with a Bragg grating embedded within the fiber between the two fiber attachment locations. The fiber is attached at both locations so as to place the grating in tension. As the bellows is compressed due to an external pressure change, the tension on the fiber grating is reduced, which changes the wavelength of light reflected by the grating. Such a sensor requires a complex bellows structure and does not constrain the fiber from buckling in the grating region.

Another example of a fiber grating pressure sensor is described in Xu, M. G., et al, "Fibre grating pressure sensor with enhanced sensitivity using a glass-bubble housing", Electronics Letters, 1996, Vol. 32, pp. 128-129. In this example, an optical fiber is secured by UV cured cement to a glass bubble at the fiber's two ends, with a grating formed in the fiber at a location situated inside the bubble. However, such a sensor does not constrain the optical fiber against buckling in the region of the grating.

It is also known that a grating-based pressure sensor may be made by placing a polarization maintaining optical fiber in a capillary tube having rods therein, and measuring changes in grating birefringence caused by changes in the transverse strain on the fiber grating due to transverse pressure forces acting on the capillary tube, as is discussed in U.S. Pat. No. 5,841,131. However, such a technique may be difficult and expensive to implement.

Another limitation of the use of fiber Bragg gratings as integral parts of a pressure sensor is that the tension on the optical fiber of such a sensor cannot be very great without breaking the fiber. Accordingly, such a sensor may have a limited range of sensitivity.

Attempts have been made to use Fabry-Perot optical cavity sensors to measure pressure. Typically, sensors of this type rely upon a polished optical fiber as one reflector of the optical cavity and a flexible diaphragm as the other reflector of the cavity, and a gap between the two. As the pressure increases in such a sensor, the diaphragm deflects, changing the gap. One disadvantage of this construction is that the diaphragm, when it deflects, does not remain perfectly flat as the pressure changes, since at least the periphery of the diaphragm is typically attached to the sensor housing to hold the diaphragm. This provides multiple reflective paths that distort the spectrum of the light within the Fabry-Perot optical cavity, resulting in measurement errors.

Other Fabry-Perot pressure sensors have been described using two optical fibers placed in opposite ends of a glass ferrule, then bonded in place with a desired gap. The glass ferrule must be of sufficient strength and thickness to withstand high external pressures. If the fibers are bonded inside the ferrule along their entire length, only the area of the gap, typically on the order of 100 microns, will be affected by the applied pressure, which provides very low sensitivity. Attempts to improve the sensitivity of such devices by bonding the fiber only partially along its length, leaving a portion of the fiber adjacent to the gap free, results in erroneous measurements due to the unbonded portion of the optical fiber sticking or slipping in the ferrule as the pressure changes. Moreover, the unbonded sections may move excessively in response to vibrations, resulting in increased measurement error.

What has been needed, and heretofore unavailable is a relatively inexpensive, yet rugged and temperature stabile, sensor for measuring pressure in a harsh environment, such as, for example, a well bore, that overcomes the problems of electronic quartz gauges or sensors incorporating fiber Bragg gratings. Such a sensor would isolate the electronics and other equipment necessary to analyze signals representing changes in pressure within the well bore from the harsh environment of the well. The present invention satisfies these, and other needs.

SUMMARY OF THE INVENTION

The present invention is generally embodied in a pressure sensor formed by fabricating a Fabry-Perot optical cavity at the end of a length of optical fiber. The housing of the sensor changes in dimension in response to changes in pressure, thus changing the dimension of a gap forming an optical cavity between a partial mirror disposed at a distal end of the optical fiber and a mirror formed on the distal end of a plug. Changes in the dimension of the gap affect the optical path length of the Fabry-Perot device, resulting in a detectable change in a quality, such as the wavelength, frequency or intensity, of the light reflected back up the optical fiber to electronics configured to analyze the returned light.

In one aspect, the present invention is embodied in a device for sensing the pressure of an environment, comprising a capillary having a proximal end and a distal end, and a bore extending therebetween, an optical fiber having a proximal end and a distal end, the distal end configured to partially reflect light, the distal end being disposed within and extending through the bore of the capillary to the distal end of the capillary, a tube having a proximal end and a distal end and a length, a plug having a proximal end and a distal end, the distal end configured to reflect light, and the distal end of the plug is disposed in an opening at the distal end of the tube, wherein the optical fiber and capillary are inserted into an opening at the proximal end of the tube for a selected distance such that a gap is formed within the tube between the distal end of the optical fiber and the distal end of the plug.

In one aspect, the optical fiber is fused to the capillary, and the capillary is fused to the tube, and the plug is fused to the tube. In another aspect, the capillary, tube and plug may be formed from fused silica. In other aspects of the present invention, one or all of the capillary, tube and plug may be formed from a suitable material other than fused silica, such as, for example, glass or Pyrex.

In another aspect of the present invention, the gap is filled with air. Alternatively, the gap may be filled with a gas other than air, or the gap map be evacuated so as to contain a reduced pressure of gas, or a vacuum.

In yet another aspect of the present invention, the distal end of the plug is an optically polished mirror. In still another aspect, the distal end of the plug may have a coating to provide relatively high optical reflectivity, which may be, in some aspects, approximately 100 percent. The coating may be a metal coating, such as, for example, gold, silver and aluminum or other high reflective coating.

In one alternative aspect, the distal end of the optical fiber is polished flat. In another alternative aspect, the distal end of the optical fiber is a curved surface. In yet another alternative aspect, the distal end of the optical fiber is cleaved flat. In yet another alternative aspect, the distal end of the optical fiber has a coating to increase the reflectivity of the distal end of the optical fiber above the reflectivity of a glass to air interface.

In another aspect, the present invention also includes at least one periodic refractive index perturbation disposed in the optical fiber at a location proximal to the distal end of the optical fiber for providing temperature compensation.

In still another aspect, the present invention is embodied in a pressure sensor for use in harsh environments, comprising a sensor assembly including: a capillary having a proximal end and a distal end, and a bore extending therebetween, an optical fiber having a proximal end and a distal end, the distal end configured to partially reflect light, the distal end being disposed within and extending through the bore of the capillary to the distal end of the capillary, a tube having a proximal end and a distal end and a length, and a plug having a proximal end and a distal end, the distal end configured to reflect light, and the distal end of the plug is disposed in an opening at the distal end of the tube, wherein the optical fiber and capillary are inserted into an opening at the proximal end of the tube for a selected distance such that a gap is formed within the tube between the distal end of the optical fiber and the distal end of the plug, a housing defining a sensor chamber, the housing having a proximal end and a distal end, the distal end of the housing having a port formed therein, the sensor mounted within the sensing chamber such that the proximal end of the optical fiber extends through a pressure seal disposed in a wall of the housing forming a proximal end of the sensing chamber.

In another aspect, the sensing chamber is filled with a fill material, which may be a non flowing, compressible material in some aspects of the invention. In still another aspect, the present invention may include an isolator means mounted at the distal end of the housing and in communication with an interior of the sensing chamber through the port. In one aspect the sensing chamber is filled with a fluid. In another aspect, the isolator means is a bellows or alternatively the isolator means is a structure responsive to changes in pressure and capable of communicating such changes in pressure to the sensing chamber.

In still another aspect of the present invention, the invention is embodied in a pressure sensing system for sensing pressures, comprising: a light source; a bi-directional coupler in optical communication with light source, a pressure sensor having a Fabry-Perot optical cavity, the pressure sensor in optical communication with the bi-directional coupler, the bi-directional coupler providing a pathway for transmitting light from the light source to the pressure sensor and also providing a pathway for transmitting light reflected by the Fabry-Perot optical cavity of the pressure sensor, and analyzing means in optical communication with the bi-directional coupler for analyzing the light reflected by the Fabry-Perot optical cavity in the pressure sensor to determine changes in pressure sensed by the pressure sensor.

In another aspect, the light source is a tunable laser. In yet another aspect, the analyzing means is an optical power meter or, alternatively, the analyzing means is an optical spectrum analyzer. In yet another aspect, the bi-directional coupler is a circulator.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

The present invention as illustrated by way of example in the accompanying drawings, and generally comprises a pressure sensor disposed at the end of a fiber optic that is configured to be deployed down the bore of a well to measure changes in pressure within the well bore. In general, the pressure sensor of the present invention includes a Fabry-Perot optical cavity mounted at the end of the optical fiber. As will be discussed in more detail below, light is transmitted down the optical fiber until it reaches the Fabry-Perot optical cavity. At the Fabry-Perot optical cavity, a portion of the light is reflected, forming an interference within the optical cavity. As pressure changes are transmitted to the optical cavity, the interference within the optical cavity changes. These changes can be detected from the light that is reflected by the optical cavity back up the optical fiber. Using suitable electronics and optical components to analyze and convert the changes in the returned light into digital signals representative of the pressure changes, the digital signals may then be analyzed and displayed or stored for further analysis. Additionally, reports, alerts, or other signals may be generated in response to the analyzed pressure signals to inform well operators of conditions within the well bore that may require their attention.

In general, a Fabry-Perot optical cavity or dual mirror optical cavity, which is known in the art, comprises at least two mirrors, which are separated from each other by a certain distance. For ease of understanding, a Fabry-Perot optical cavity or dual mirror optical cavity will be referred to as a Fabry-Perot optical cavity to facilitate the description, however, in no way should this description be construed as limiting the invention.

When light is incident upon the Fabry-Perot optical cavity, optical interference occurs. As a result of the optical interference, at certain optical resonance frequencies corresponding to interference fringes, about 100% of the light is transmitted through the Fabry-Perot optical cavity, and none of the light is reflected. Conversely, at other frequencies, about 100% of the light is reflected by the Fabry-Perot optical cavity, and none of the light is transmitted through the Fabry-Perot optical cavity. Positions of the optical resonance frequencies are sensitive to, and depend on, an optical path length between the mirrors in the Fabry-Perot optical cavity. Further, the optical path between the mirrors depends on pressure on the Fabry-Perot optical cavity. Therefore, by evaluating interferences, a pressure condition can be readily determined.

Pressure conditions on the object are determined by a remote optical interrogation of the light. As described hereinafter, using light reflected from the mirrors in Fabry-Perot optical cavity, various conditions on the object, such as temperature and pressure conditions, can be determined.

Figure 1:
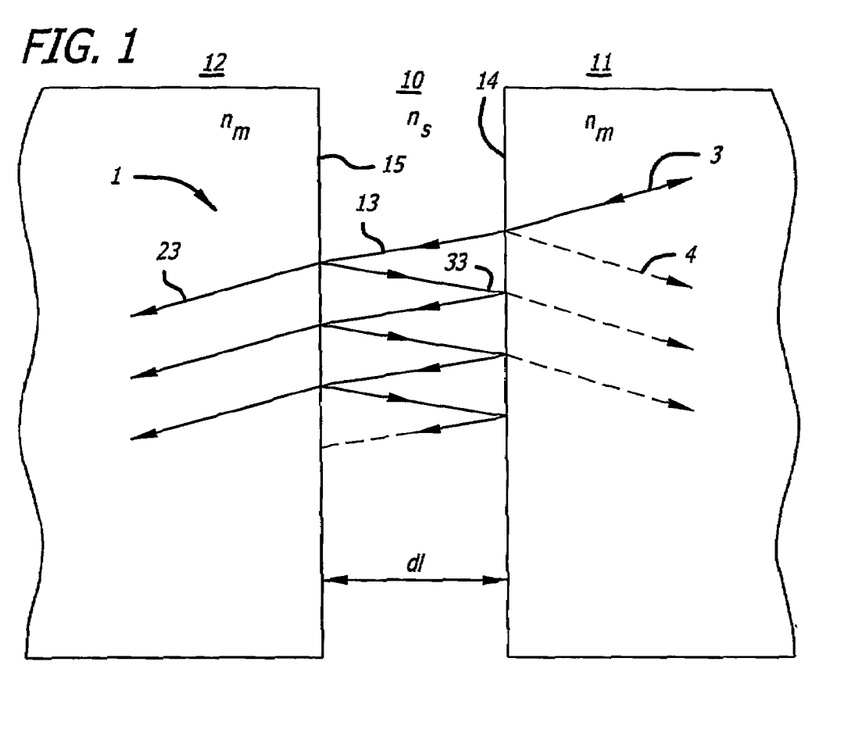
FIG. 1 is a side cross-sectional illustration of a Fabry-Perot optical cavity.

A brief description of the Fabry-Perot optical cavity will now be provided with reference to FIG. 1. Fabry-Perot optical cavity 1, as illustrated in FIG. 1, comprises at least two mirrors 11 and 12. The at least two mirrors 11 and 12 are at least partially reflective. In the Fabry-Perot optical cavity 1, the at least two mirrors 11 and 12 are separated from each other by a space 10 having a distance dl. Space 10 between the at least two mirrors 11 and 12 defines a refractive index $n_s$, which is different from the refractive index $n_m$ of the at least two mirrors 11 and 12.

When a light ray 3, also known as a light wave, is incident upon the Fabry-Perot optical cavity 1, reflection and transmission of the light wave 3 occurs at a first interface 14, which is defined as the interface between first mirror 11 and space 10. A component 4 of the light wave 3 is reflected away from the Fabry-Perot optical cavity 1, and assuming normal reflection conditions, does not further interact with the Fabry-Perot optical cavity 1. A transmitted light wave component 13 from the light wave 3 passes through the space 10 until it strikes the second interface 15 at the mirror 12. A reflected component 33 of the transmitted light wave 13 is then reflected by the interface 15. A transmitted component 23 of the transmitted light wave 13 is transmitted through the mirror 12, and assuming normal reflection conditions, does not further interact with the Fabry-Perot optical cavity 1.

The reflected component 33 of the transmitted light wave 13 remains in the space 10 between the at least two mirrors 11 and 12, and is directed back towards interface 14. The reflected component 33 of the transmitted light wave 13 is again reflected and transmitted at the interface 14, as discussed above with reference to the interface 15. The reflection and transmission of light wave components will continue, as discussed above and illustrated in FIG. 1, with a component of the reflected light wave component being transmitted and a component of the reflected light wave being again reflected each time a component of the reflected light wave encounters an interface 14 or 15.

Optical interference in a Fabry-Perot optical cavity occurs as a result of the continued reflection and transmission of light waves. The overall reflectivity (R) from a Fabry-Perot optical cavity depends, in a simplest case, on the reflectivity (r) of each mirror, the distance (d) between the mirrors, the index of refraction (n) of a medium between the mirrors, and an angle of incidence (Θ) of a light wave from an energy source. Accordingly, the overall reflectivity (R) from a Fabry-Perot optical cavity is determined by:

Equation 1: 
$$R = \frac{1}{1 + \left(\frac{\pi}{2F}\right)^2 \left(\sin\left(\frac{\pi v}{v_{ax}}\right)\right)^{-2}} \quad (1)$$

where, $v$ is a frequency, F is a finesse of the Fabry-Perot optical cavity (to be described hereinafter), and $a_x$ is a spacing between interference peaks $a_x$.

The finesse F is, in the simplest case of a Fabry-Perot optical cavity comprising two mirrors having the same reflectivity, a measure of the Fabry-Perot optical cavity's overall reflectivity characteristics. The finesse F is determined according to Equation (2) in terms of mirror reflectivity (r):

Equation 2:

$$F = \frac{\pi\sqrt{r}}{1-r} \quad (2)$$

Interference of the light waves occurs as a result of combined reflection and transmission of the light waves. A spacing between interference peaks $a_x$ of the light waves results from continued reflection of a light wave in the Fabry-Perot optical cavity. The spacing $a_x$ between interference peaks of the light waves in the Fabry-Perot optical cavity can be written in terms of the speed of light c. The spacing $v_{ax}$ of the interference peaks is determined, in accordance with:

Equation 3:

$$v_{ax} = \frac{c}{2nd \cdot \cos\theta} \quad (3)$$

Figure 2:
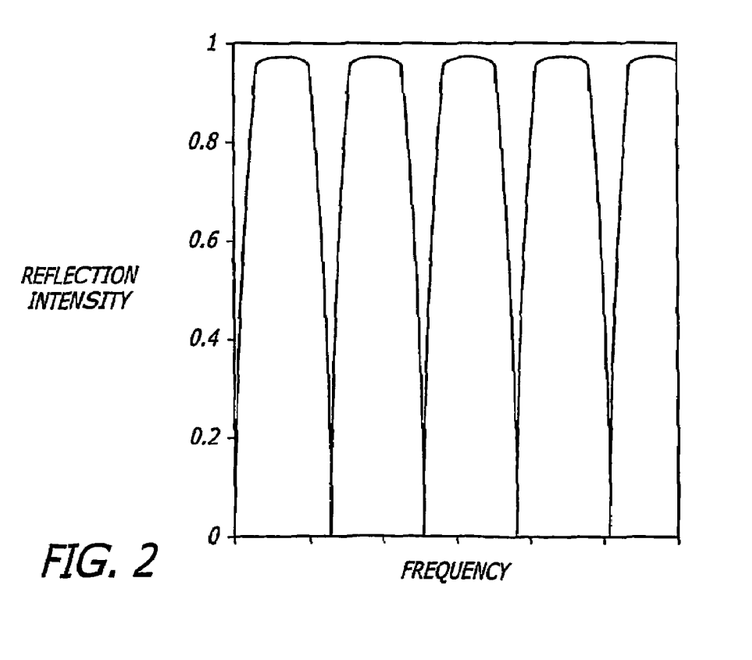
FIG. 2 is a schematic graph of reflectance versus frequency for a Fabry-Perot optical cavity.

A typical reflection intensity, or reflectivity, versus frequency profile for Fabry-Perot optical cavity, determined from Equations (1)-(3), is plotted in FIG. 2. In FIG. 2, there are a series of reflectivity minima, which are spaced apart by spacing $v_{ax}$ between interference peaks. A position of each minimum $v_m$ is directly related to a spacing $v_{ax}$ between interference peaks, and can be determined from Equation (4):

Equation 4: $v_m = m v_{ax}$ (4)

where m is an integer.

A frequency width $v_c$ of a minima peak in FIG. 2 is expressed in terms of the finesse F and the spacing $v_{ax}$. The frequency width $v_c$ of a minima peak is approximately given by:

Equation 5:

$$v_c = \frac{v_{ax}}{F} \quad (5)$$

As can be seen from Equations (3) and (4), the position of each minima is dependent on an index of refraction (n) and distance (d) between the mirrors in the Fabry-Perot optical cavity. Accordingly, it follows that a change in position of each minima is related to a change in optical length parameters. This change in position of each minima $\Delta v_m$ is thus determined in accordance with:

Equation 6:

$$\Delta v_m = v_m \left( \frac{\Delta d}{d} + \frac{\Delta n}{n} \right) \quad (6)$$

A change in reflectance minima frequencies $\Delta v_m$, for example, due to changes in pressure $\Delta P$, is then determined by:

Equation 7:

$$\Delta v_m = v_m \left( \frac{1}{d} \cdot \frac{\partial d}{\partial P} + \frac{1}{n} \cdot \frac{\partial n}{\partial P} \right) \cdot \Delta P \quad (7)$$

where relative magnitudes of the terms depend on particulars of the Fabry-Perot optical cavity configuration.

Figure 3:
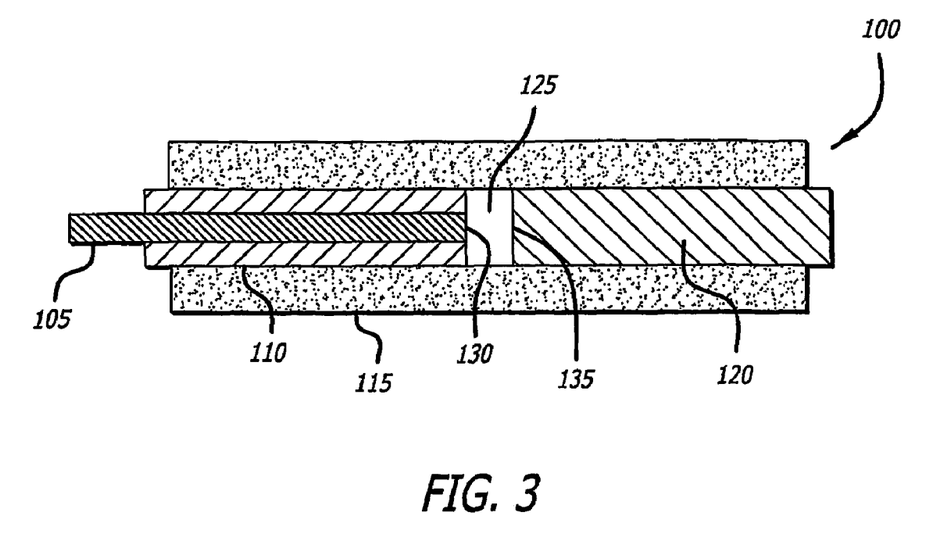
FIG. 3 is a side cross-sectional view of a pressure in accordance with one embodiment of the present invention.

FIG. 3 depicts one embodiment of a pressure sensor 100 utilizing a Fabry-Perot optical cavity in accordance with the principles of the present invention. Pressure sensor 100 is mounted on the end of optical fiber 105. The end of optical fiber 105 is fused within a capillary 110, which in turn is fused within the bore of a tube 115. Plug 120 is inserted into the end of tube 115 opposite the end of tube 115 where the end of optical fiber 105 is inserted. Plug 120 is sized such that when plug 120 is inserted in the end of tube 115, a gap 125 is formed between an end of plug 120 and the end of the optical fiber 105.

The inserted end of the optical fiber 105 is flat polished or cleaved to form a partially reflective 130 mirror on the end of optical fiber 105. The fiber end may also be curved to form a curved partially reflective mirror. The end of mirror 130 may also be coated with an optical coating, or it may not be coated with an optical coating, depending on the design requirements of the pressure sensor. Suitable coatings include various coatings that are known to those skilled in the art to control reflectivity or other optical property.

The inserted end of plug 120 may be polished or cleaved, or otherwise formed to provide a mirror 135 having a very high reflectivity, preferably close to 100% reflectance. Plug 120 is fused within tube 115. Tube 115, capillary 110 and plug 120 may be formed from fused silica or other suitable glass material.

Gap 125 may be filled with air, or, alternatively, gap 125 may be evacuated to a low pressure, such that gap 125 may be thought to contain a vacuum. Alternatively, gap 125 may be filled with a gas other than air, depending on the design requirements of the device. Because optical fiber 105 is fused to capillary 110, and capillary 110 is fused to tube 115, and plug 120 is fused to tube 115, the gas or vacuum contained within gap 125 should not be able to escape from the gap and thus should be maintained within gap 125.

The partial mirror 130, gap 125 and mirror 135 act as an optical resonator. Due to the arrangement of partial mirror 130 and mirror 135, an interference is produced within the gap 125. This interference changes as a function of changes in the dimensions of gap 125 resulting from changes in pressure on the exterior of the pressure sensor 100.

The sensor of the present invention differs from a classical Fabry-Perot optical cavity in that the light emitting from the end of the inserted end of the optical fiber 105 through the partially reflecting mirror 130 is somewhat divergent. This divergence results in a limited number of interfering light rays within the gap 125, resulting in a slight attenuation of the light reflected by mirror 135. This slight attenuation may be overcome by ensuring that the reflectivity of mirror 135 is greater than the reflectivity of partial mirror 130.

Figure 4:
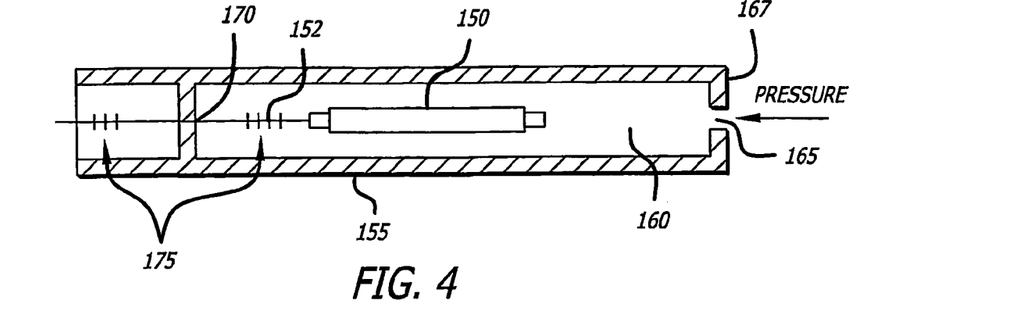
FIG. 4 is a side view, partially in cross-section, showing a pressure sensor in accordance with the embodiment depicted in FIG. 3 disposed within a housing for deployment in a harsh environment.
Figure 5:
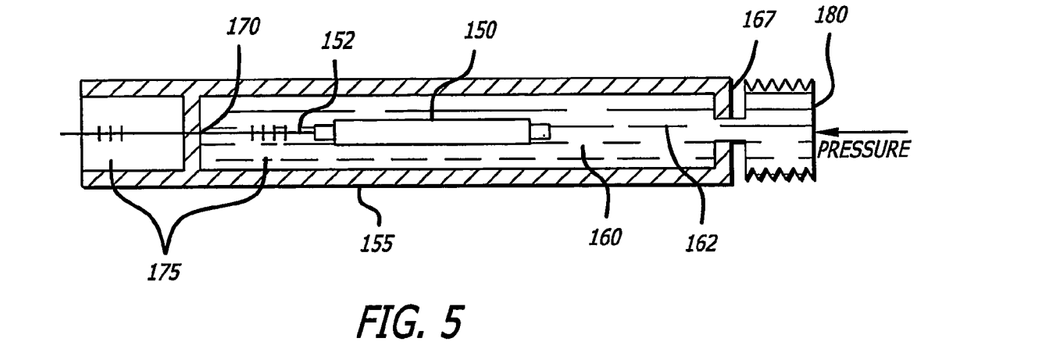
FIG. 5 is a side view, partially in cross-section, showing a pressure sensor system similar to that depicted in FIG. 4 using a bellows to isolate the pressure sensor from the environment being monitored.
Figure 6:
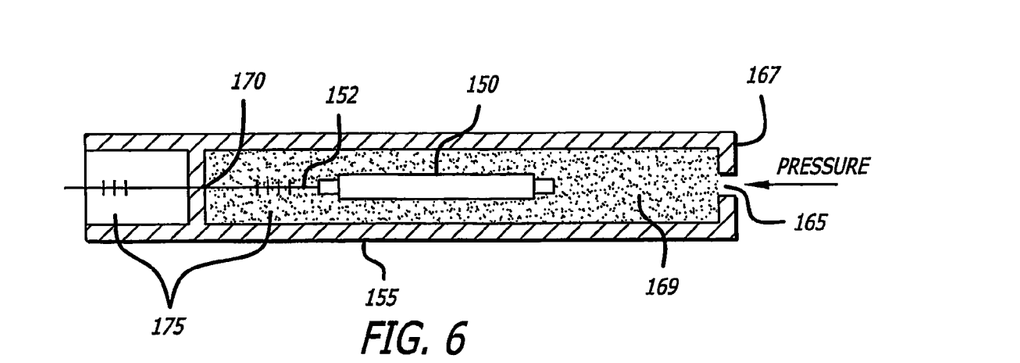
FIG. 6 is a side view, partially in cross-section, showing a pressure sensor system similar to that depicted in FIG. 4 using a fill material to isolate the pressure sensor from the environment being monitored.

FIGS. 4-6 depict various embodiments of a pressure sensor 150 of the present invention shown deployed within a protective housing 155. In FIG. 4, pressure sensor 150, constructed as described with reference to FIG. 3, is enclosed within housing 155. Housing 155 may be a stainless steel pipe, a glass pipe or tube, or other arrangement that has walls that form a sensing chamber 160. A port 165 is disposed in distal end 167 of housing 155 to expose the interior of sensing chamber 160 to the pressure of the environment which is to be monitored. Pressure sensor 150 is attached to optical fiber 152, which extends through a high pressure seal 170 in the distal end of the sensing chamber 160. Fiber Bragg gratings 175 may be formed in optical fiber 152 to provide a means for temperature compensation, as is well known by those skilled in the art. This temperature compensation means is useful to provide a correction for changes in the dimensions of the gap 125 of pressure sensor 150 that affect the performance of the Fabry-Perot optical cavity that are artifacts of temperature changes that are unrelated to changes in pressure within the well hole.

In this embodiment, the pressure sensor is enclosed in a housing formed from a rigid metal or other suitable material that is capable of withstanding the desired operating pressure. As the pressure increases, the fluid/gas from the surrounding environment enters the sensing chamber 160 through port 165, thereby increasing the pressure on the sensor 150, changing the gap 125 (FIG. 3). While this embodiment is useful, exposure to harsh environments may degrade the sensor 150.

FIG. 5 depicts an alternative embodiment of the pressure sensor system of FIG. 4. In this embodiment, the interior of sensing chamber 160 is isolated from the environment in which the sensor is deployed by mounting an isolator, such as a bellows 180, to port 165. Sensing chamber 160 may be filled with a fluid 162 to provide for transfer of pressure changes in the environment to the sensor 150. For example, when the pressure of the environment increases, bellows 180 is compressed, increasing the pressure of the fluid within sensing chamber 160, which in turn increases the pressure on the sensor 150, changing the dimensions of gap 125 (FIG. 3) of the sensor 150. The process is reversed when the pressure of the environment decreases, causing bellows 180 to expand.

The fill fluid 162 must be chosen carefully to ensure compatibility with the components of the pressure sensor. Further, the fill fluid selected for use should have a coefficient of thermal expansion that will not result in over extension of the bellows beyond its mechanical limits. Additionally, any air trapped within the sensing chamber and bellows assembly will compress or decompress depending on the pressure change, resulting in error in the pressure detection. Thus, it is advantageous to remove all air or other gases from the chamber 160 before filling the chamber 160 with fluid 162.

FIG. 6 depicts another embodiment of the present invention wherein port 165 of housing 155 remains open to the environment, but sensing chamber 160 is filled with a non-flowing fill material 169, such as, for example, grease, gel, non-hardening rubber, and the like. The fill material 169 should remain compliant and resilient under the conditions experienced in the operating environment, and couple the changes in environmental pressure to the pressure sensor 150 so that the dimensions of gap 125 (FIG. 3) of sensor 150 changes in response to the changes in the pressure in the environment. Use of a non-flowing material 169 to fill sensing chamber 160 is advantageous in that the relatively delicate bellows is not required, the fill material 169 will not escape from the sensing chamber, and the fill material 169 also acts to hold and stabilize the sensor 150 within the sensing chamber 160, which may be useful in protecting the sensor 150 from damage due to shock from handling, dropping, or other events that occurs during deployment of the sensor.

Figure 7:
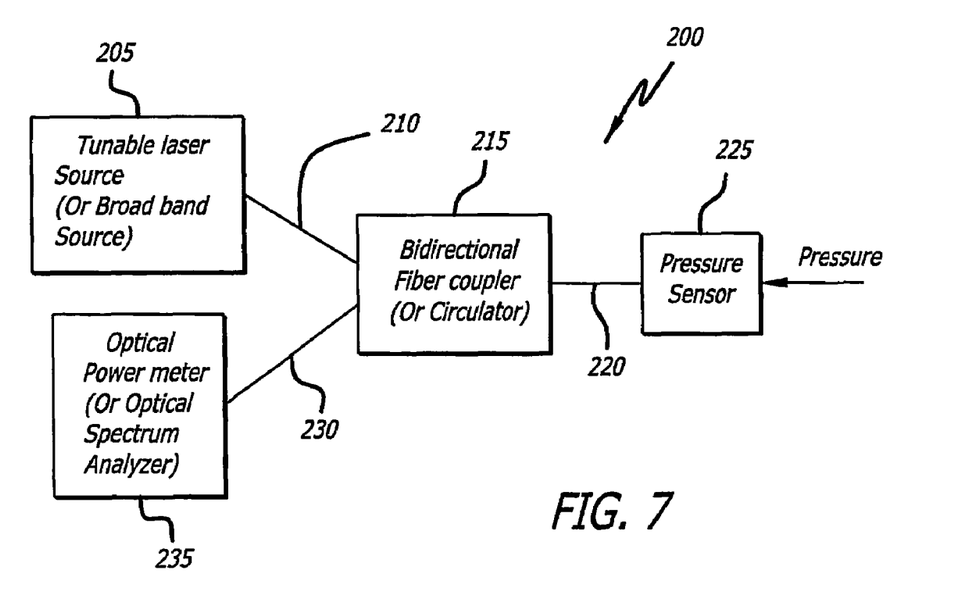
FIG. 7 is a schematic representation of a pressure sensor system in accordance with one embodiment of the present invention.

FIG. 7 depicts one embodiment of a system including the pressure sensor of the present invention and apparatus and electronics for converting the information contained within light reflected from the sensor into digital signals representative of detected changes in pressure and capable of being analyzed to determine changes in pressure within the environment being monitored Laser light from a tunable laser or broadband source 205 is launched into the optical fiber 210 through a bi-directional coupler and then through optical fiber 220 to pressure sensor 225. Light reflected by the Fabry-Perot optical cavity in pressure sensor 225 (see FIG. 3) is transmitted back through optical fiber 220 and the bi-directional coupler 215 into optical fiber 230 to optical power meter 235.

The system depicted in FIG. 7 may take the form of several alternative embodiments without departing from the spirit of the present invention. For example, a circulator may also be used instead of bi-directional coupler. A broad band optical source may be used in place of the tunable laser, and an optical spectrum analyzer may be used in place of the optical power meter to analyze the signal information contained in the light reflected from sensor 225. These alternatives may be incorporated into the system in any combination.

Figure 8:
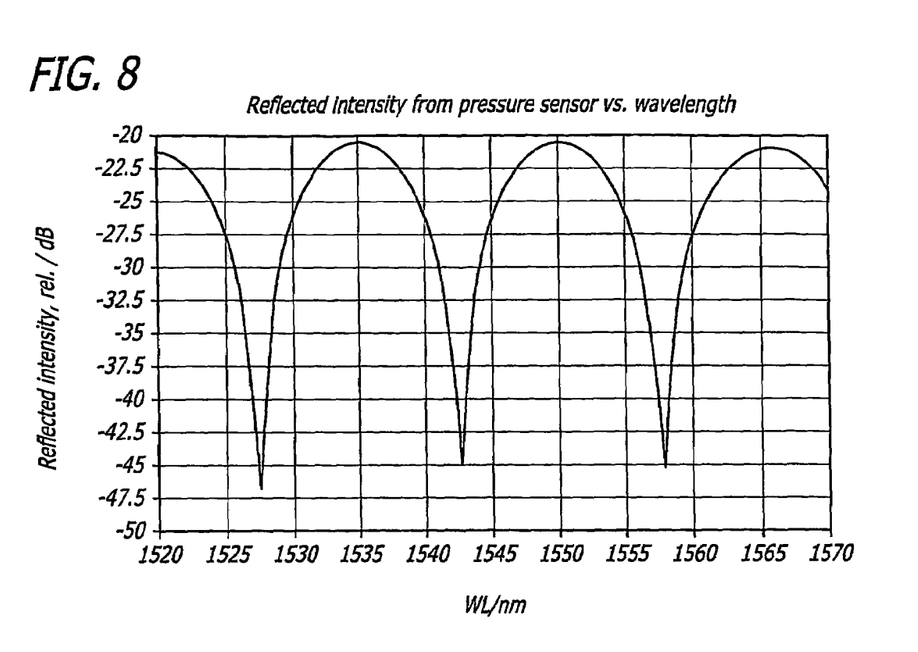
FIG. 8 is a schematic graph of reflectance versus wavelength for the embodiment of the pressure sensor depicted in FIG. 3.

FIG. 8 depicts a graph of the intensity of light reflected by the Fabry-Perot optical cavity of the pressure sensor of the present invention as a function of wavelength. It is apparent from this graph that changes in the spectrum may be analyzed to determine the dependence of the observed spectral changes as a function of changes in the dimensions of the gap 125 (FIG. 3) of the pressure sensor as a function of changes in the pressure of the environment in which the pressure sensor is deployed.

As is seen from FIG. 8, the wavelengths of the sharp notches, or minima, of the wavelength spectrum are easily determined, and these wavelengths fulfill the resonance conditions for standing waves in a resonator structure such that the width of gap 125 (FIG. 3) may be calculated in accordance with:

Equation 8: $$\text{Gap} = \frac{M \times \lambda_{N_M}}{2} \qquad (8)$$

where M is an integer number, and $\lambda_{NM}$ is the wavelength of notch M.

Figure 9:
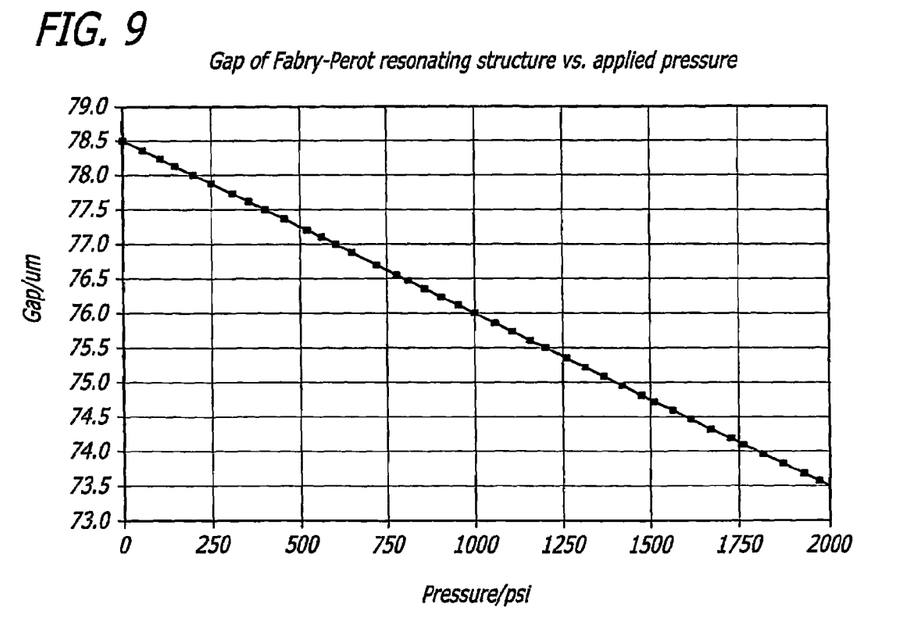
FIG. 9 is a schematic graph of gap width versus applied pressure for the embodiment of the pressure sensor depicted in FIG. 3.

Typically, at least two notch wavelengths are used to calculate the dimension of the gap 125. Because the dimensions of gap 125 change as a function of the pressure exerted upon the sensor 100 (FIG. 3), a look up table may be generated containing a matrix of values representing the dependence of gap dimension as a function of pressure. FIG. 9 illustrates such a dependence for one embodiment of the pressure sensor of the present invention, showing how the width of gap 125 changes as a function of pressure applied to the pressure sensor 100 (FIG. 1). A suitable processor programmed with suitable software, or a hard wired circuit board, or embedded processor may be used to analyze the signals from the pressure sensor in accordance with such a lookup table stored in a suitable memory media accessible by the processor to determine a value for the change in pressure experienced by the pressure sensor.

The various embodiments of the present invention are advantageous in that they provide a rugged pressure sensor capable of operating in harsh environments that avoid the problems associate with prior art sensors. For example, unlike Fabry-Perot sensors utilizing a diaphragm as one mirror of the optical cavity, the reflective surfaces of the present invention remain substantially parallel under all but the most extreme pressure changes. Further, fusing the optical fiber ends within a capillary and then fusing the capillary within a tube allows increased pressure sensitivity without increasing the sensitivity of the optical cavity to vibration or stick/slip effects experienced with prior art devices.

While several particular forms of the invention have been illustrated and described, it will be apparent that various modifications can be made without departing from the spirit and scope of the invention.

What is claimed is:

1. A device for sensing the pressure of an environment, comprising:
   a capillary having a proximal end and a distal end, and a bore extending therebetween;
   an optical fiber having a proximal end and a distal end, the distal end configured to partially reflect light, the distal end being disposed within and extending through the bore of the capillary to the distal end of the capillary;
   a tube having a proximal end and a distal end and a length;
   a plug having a proximal end and a distal end, the proximal end configured to reflect light;
   a tube having a proximal end configured for receiving the optical fiber and capillary such that the optical fiber and capillary extend into the tube for a selected distance, the tube extending for a length to a distal end, the distal end of the tube configured for receiving the plug such that a gap is formed within the tube between the distal end of the optical fiber and the proximal end of the plug; and
   at least one periodic refractive index perturbation disposed in the optical fiber at a location proximal to the distal end of the optical fiber for providing a measurement of a temperature effect upon the gap within the tube.

2. The device of claim 1, wherein the optical fiber is fused to the capillary, and the capillary is fused to the tube, and the plug is fused to the tube.

3. The device of claim 1, wherein the capillary is formed from fused silica.

4. The device of claim 1, wherein the tube is formed from fused silica.

5. The device of claim 1, wherein the plug is formed from fused silica.

6. The device of claim 1, wherein the gap is filled with a gas.

7. The device of claim 6, wherein the gas is air.

8. The device of claim 1, wherein the gap contains a vacuum.

9. The device of claim 1, wherein the proximal end of the plug is an optically polished mirror.

10. The device of claim 1, wherein the proximal end of the plug has a coating to provide relatively high optical reflectivity.

11. The device of claim 10, wherein the coating is a metal coating or other high reflective coating.

12. The device of claim 11, wherein the metal coating is selected from the group consisting of gold, silver and aluminum.

13. The device of claim 1, wherein the reflectivity of the proximal end of the plug is approximately 100 percent.

14. The device of claim 1, wherein the distal end of the optical fiber is polished flat.

15. The device of claim 1, wherein the distal end of the optical fiber is a curved surface.

16. The device of claim 1, wherein the distal end of the optical fiber has a coating to increase the reflectivity of the distal end of the optical fiber above the reflectivity of a glass to air interface.

17. The device of claim 1, wherein the optical fiber is a single mode fiber.

18. The device of claim 1, wherein the optical fiber has a core and a cladding layer.

19. The device of claim 1, wherein the distal end of the optical fiber is flat cleaved.

20. A pressure sensor for use in harsh environments, comprising:
    a sensor assembly including:
    a capillary having a proximal end and a distal end, and a bore extending therebetween,
    an optical fiber having a proximal end and a distal end, the distal end configured to partially reflect light, the distal end being disposed within and extending through the bore of the capillary to the distal end of the capillary;
    a tube having a proximal end and a distal end and a length, and
    a plug having a proximal end and a distal end, the proximal end configured to reflect light, and the proximal end of the plug is disposed in an opening at the distal end of the tube, wherein the optical fiber and capillary are inserted into an opening at the proximal end of the tube for a selected distance such that a gap is formed within the tube between the distal end of the optical fiber and the proximal end of the plug;
    a housing defining a sensor chamber, the housing having a proximal end and a distal end, the distal end of the housing having a port formed therein, the sensor mounted within the sensing chamber such that the proximal end of the optical fiber extends through a pressure seal disposed in a wall of the housing forming a proximal end of the sensing chamber.

21. The device of claim 20, wherein the sensing chamber is filled with a fill material.

22. The device of claim 21, wherein the fill material is a non-flowing, compressible material.

23. The device of claim 20, further comprising an isolator means mounted at the distal end of the housing and in communication with an interior of the sensing chamber through the port.

24. The device of claim 23, wherein the sensing chamber is filled with a fluid.

25. The device of claim 23, wherein the isolator means is a bellows.

26. The device of claim 23, wherein the isolator means is a structure responsive to changes in pressure and capable of communicating such changes in pressure to the sensing chamber.

27. A pressure sensing system for sensing pressures, comprising:
    a light source;
    a bi-directional coupler in optical communication with light source;
    a pressure sensor having a Fabry-Perot optical cavity, the pressure sensor in optical communication with the bi-directional coupler, the bi-directional coupler providing a pathway for transmitting light from the light source to the pressure sensor and also providing a pathway for transmitting light reflected by the Fabry-Perot optical cavity of the pressure sensor; and
    analyzing means in optical communication with the bi-directional coupler for analyzing the light reflected by the Fabry-Perot optical cavity in the pressure sensor to determine changes in pressure sensed by the pressure sensor, the analyzing means configured to determine a width of a gap in the Fabry-Perot optical cavity from a distance determined between two interference fringes within the cavity and to determine a pressure value from the width of the gap.

28. The system of claim 27, wherein the light source is a tunable laser.

29. The system of claim 27, wherein the analyzing means is an optical spectrum analyzer.

30. The system of claim 27, wherein the bi-directional coupler is a circulator.

31. The system of claim 27, wherein the optical communication between the light source, bi-directional coupler, pressure sensor and analyzing means is provided by optical fiber.

* * * * *